May 19, 1942.    O. M. BURKHARDT    2,283,536
MECHANICAL CLEARANCE REGULATOR
Filed Oct. 18, 1937
FIG. 2.
FIG. 1.
FIG. 3.
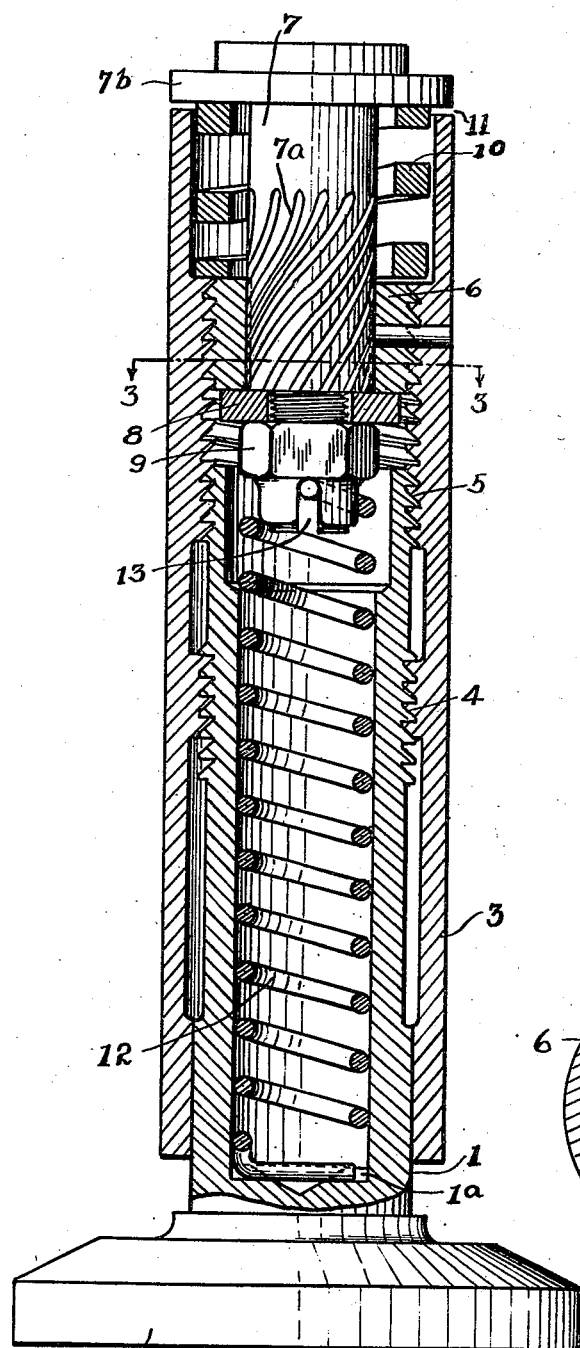
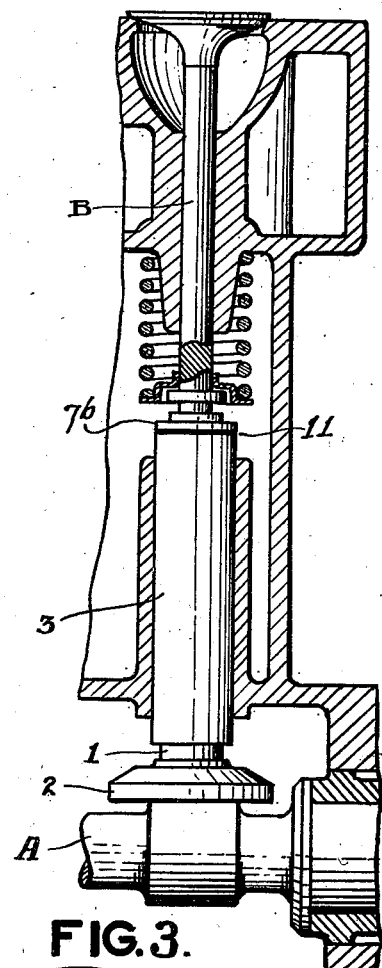
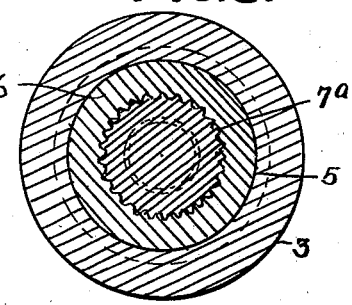
INVENTOR
OTTO M. BURKHARDT.
BY *Milburn & Milburn*
ATTORNEYS.

Patented May 19, 1942

2,283,536

UNITED STATES PATENT OFFICE 2,283,536

MECHANICAL CLEARANCE REGULATOR

Otto M. Burkhardt, Cleveland, Ohio, assignor to Thompson Products, Inc., Cleveland, Ohio Application October 18, 1937, Serial No. 169,642

8 Claims. (Cl. 123—90)

This invention relates to an automatically adjustable mechanical clearance regulator for internal combustion engines, this invention being an improvement upon the type of device shown in the patent to Harrington, No. 1,474,078, November 13, 1923.

In the device of the Harrington patent, supra, provision is made for only taking up slackness in the valve linkage but not for providing any clearance. Practical success dictates that not only must such a device be capable of taking up any slackness due to wear and contraction, but it must also be capable of automatically compensating for expansion which frequently occurs in the linkage.

There have been also other devices of the same general type as that of the Harrington patent, supra, but without disclosing structure that is capable of practical success from the standpoint of either operation or manufacture. Not only must such a device be capable of performing the function required in an efficient manner and dependably so over a long period of time and under all conditions, but it must also be capable of quantity production at low cost.

It is therefore the object of the present invention to devise an automatic mechanical clearance regulator of the type above referred to, that provides a certain predetermined amount of slackness or relative movement during the opening of the valve, thereby compensating for expansion in the valve linkage, and upon closing of the valve it ensures the taking-up of slackness due to wear and contraction.

A further object is to devise such an automatic clearance regulator that is universally capable of being applied to the various models of engines, as for instance the L-head, the over-head valve and radial types of engines which have the cam shaft mounted in the crank case, and also the over-head valve type of engine with the cam shaft mounted above the cylinder head.

It is also an object to provide such a device that can be readily installed either as standard equipment or in other new motors or in motors already in use.

The valve-actuating cams on motors already in use and those being now built are provided with long ramps to compensate for varying clearance in the valve linkage. A clearance regulator when applied to motors equipped with such cams must for greatest efficiency have a fixed clearance element as otherwise the clearance regulator would take out all clearance and so cause the valve timing to be unduly long.

A still further object is to provide such a device that is comparatively simple in construction and can be manufactured at a cost permitting its adoption in even low-priced automobiles.

Other objects will appear from the following description and claims when considered together with the accompanying drawing.

Fig. 1 is an elevation of one of my improved devices installed in an automobile engine;

Fig. 2 is an enlarged vertical sectional view of my device; and

Fig. 3 is a view taken on line 3—3 of Fig. 2.

It is to be understood that the present form of disclosure is merely for purposes of illustration and that there might be devised various modifications without departing from the spirit of my invention as herein set forth and claimed.

It will be observed that the present form of improved device, as herein disclosed, is a self-contained structure that can be conveniently handled and easily installed in lieu of the familiar tappet in the various types of internal combustion engines.

Referring to the present form of illustration, the inner member 1 has the mushroom end 2 in contact with the cam of the conventional cam shaft A. The outer member 3 has screw-threaded engagement with its companion member 1, as indicated at 4 and 5. I employ two sections of threads to obtain a pause in the screwthread engagement during assembling of members 1 and 3, as will be more fully explained below. I also employ the buttress thread at these points, as indicated in the drawing, for a purpose to be later explained.

Fixed within the upper part of the outer member 3 is the sleeve 6 which has screw-threads of a very steep incline provided upon the inside thereof for engagement by the corresponding screw-threads of the member 7, as indicated at 7a. The outer end of member 7 has the enlarged head or flange 7b approximately the diameter of the member 3. The inner end of member 7 is reduced in diameter and is screw-threaded so as to provide a shoulder against which the washer 8 is held by the nut 9. The inner end of the member 7, having washer 8 securely screwed against the shoulder by the nut 9, is then together with nut 9 provided with diametrically extending slots which are intended to be locked for maintenance of a fixed clearance, as will be explained.

In the space between the member 7 and the member 3 there is located a spring 10 which bears at its upper end against the flange 7b and at its lower end against the shoulder afforded by the end of the sleeve 6 and the adjacent part of member 3. The coil spring 10 tends to normally force the member 7 outwardly and the parts are so designed that when in such position there is a predetermined clearance 11 between the end of member 3 and the flange 7b. This clearance is permanently fixed inasmuch as washer 8 and nut 9 are fixed on part 7 through registering slots and interlocking members, as above explained. Ordinarily this clearance would be .005 to .015 inch. The function and operation of member 7 will be more fully set forth below.

Within the inner member 1 there is a coil spring 12 which has its upper end 12a anchored in the registering slots of the member 7 and nut 9, interlocking the same as above explained and as indicated at 13, and its lower end is anchored in a diametrically extending slot or recess in the bottom of member 1, as indicated at 1a. This spring normally tends to force the companion members 1 and 3 into distended position but it will permit adjustment between the members 1 and 3 in the opposite direction. Spring 12 assists spring 10 in the extending movement of the parts until washer 8 reaches its seat, when spring 10 becomes locked and spring 12 alone distends members 1 and 3. Spring 12 is not only a torsional spring but it also exerts axial pressure so that it tends not only to force members 1 and 3 apart by unscrewing the threads, but the axial force mainly acts to extend them axially with respect to each other, as will be permitted by the clearance between the threads of these two members. Sufficient clearance will be provided between the threads so as to permit the operation intended, as herein set forth.

In assembling the parts, the ends of the spring 12 are placed in the slots provided for them and the member 3 is turned backwards relative to member 1 about one turn more or less so as to place the spring under negative tension. Such backward movement will of course not engage the threads of member 3 with those of member 1. Then the threads of members 1 and 3 are engaged and screwed together one turn more or less, when spring 12 assumes a position with neither negative nor positive torque. Continued screwing together of parts 1 and 3 will then bring these parts into the position of pause provided in the arrangement of the threaded sections. When the above-described procedure is repeated, two sets of threads make contact simultaneously. They are then screwed into their proper position which applies the desired positive torque to the anchored spring 12. The positive torque must suffice under all conditions to screw members 1 and 3 apart and thus it will serve to lengthen the body of the clearance regulator to take out excess clearance, but it must not be more than needed as otherwise the impacts will not suffice to screw members 1 and 3 together by the necessary micrometric amount. Thus the threads are in two sections so that a predetermined amount of positive torque can be more accurately obtained. Also, in order to insure a sufficient amount of bearing surface between the threads, many threads have to be in contact, which ordinarily would require more turns than the torsion spring would endure with safety; hence the two sections of threads, which construction permits of a release of accumulated spring torque in the desired position.

The clearance between the threads of members 1 and 3 will normally fill up with oil but when the cam of cam shaft A exerts pressure on the end of the tappet, and the valve stem B resists with an equal pressure, the axial pressure of springs 10 and 12 is overcome as is also the clearance 11 and the bulk of the oil film between the threads and other members. Shoulder 7b contacts member 3 with an impact which may be either axial or torsional or a combination of both. This impact causes minute vibrations in the system and due to the fact that the threads of members 1 and 3 have a definite incline and a film of oil between them, it follows that when the threads themselves are caused to make new contact and vibrate as just explained, they will tend to slide down the incline thereof, overcoming the torque of spring 12 until stopped.

Since the amount of friction which increases as the pressure between the threads of members 1 and 3 increases, has much to do with the extent to which these members will screw together, I have adopted the buttress type of threads for the purpose of controlling this friction. This special type of thread has the characteristic of holding the one member concentric within its companion member; and at the same time, the bevel of the threads can be such that it produces any desirable pressure between the contact surfaces. This pressure helps to stop the vibrations quickly and increases the friction between the threads. Also, there being no bevel in the back side of the threads, they very easily free themselves and spring 12 screws them apart if excess clearance is present.

The combined action of the screw-threads 4 and the spring 12 is to releasably hold the members in the position to which adjusted; the form, incline and clearance of the threads being properly selected for this purpose. This selection is influenced by the provision of the auxiliary means which I have devised for facilitating the relative adjustment of the members 1 and 3, and which will be more fully explained below.

It might be noted that if the incline of the threads 4 and 5 were made steep enough to permit sliding between the same upon application of only longitudinal force thereto, then such an inclination of thread would, under some conditions, require an auxiliary means for holding the parts in the position to which they would be adjusted. Whereas, on the other hand, if the threads 4 and 5 were given an incline that would under all conditions serve as a frictional locking means for holding the parts in extended position, they would not always permit adjustment between the parts by application of rectilinear force or impact thereto in the manner herein contemplated. Obviously, such a device in order to be practically successful, must automatically adjust itself so as to effect proper opening and closing of the valve and must be automatically compensating for changing conditions which would otherwise interfere with proper functioning of the valve.

If the friction were always constant and the incline exactly between the two extremes above mentioned, the buttress threaded members 1 and 3 alone would constitute a clearance regulator.

The matter of wear between the parts, however, plays an important part in this consideration. Supposing, for instance, that the threads 4 and 5 might be given an incline to permit the conversion of longitudinal force into rotary adjustment and at the same time afford sufficient frictional engagement to hold the parts in adjusted position, it has been found that when such inclined surfaces of the threads become very highly polished, after working together in the presence of oil for ten or fifteen thousand miles, the friction would be so reduced that it would no longer suffice to stop the relative movement between members 1 and 3 as quickly as when the parts were originally installed.

Also, another result of this highly polished condition of these threaded members or inclined bearing surfaces is that during the period of valve-lifting, the members 1 and 3 screw together somewhat farther than when new and consequently the valve mechanism becomes noisy.

But the most important consideration in any such device is the danger of open valves. Therefore, it is necessary that during each valve-lift period there be produced a sufficient amount of relative motion between the members 1 and 3 so that when the valve returns to its seat, there is always a suitable amount of clearance in the linkage to insure proper seating. This precaution not only ensures proper valve seating but precludes sticking of the adjusting means after being in one position for a comparatively long time.

Thus a practically successful device of this kind must permit ready adjustment or regulation of clearance, but the relative motion between the members 1 and 3 must be stopped effectively at the proper point and these members must be releasably held in the position to which adjusted. Moreover, such a device must be capable of such automatic, effective and dependable adjustment under any conditions at any time.

In the present form of device, the threaded engagement 7a may be regarded as the means for converting the rectilinear force into an axial impact or if necessary into a rotary or turning movement between the members 1 and 3; while the threaded engagement 4 and 5 might be regarded as a means for holding these members in the position to which they are adjusted. As will be observed, the threads 4—5 and 7 have different angles of inclination, that of the threads 7 being much steeper, as above explained. Application of rectilinear force to the ends of the end members 1 and 7 will cause rotary movement of the member 3 so as to temporarily shorten the linkage for proper adjustment. Then, upon release of such pressure, the member 3 will return in the opposite direction so as to extend the tappet according to the requirements at any given time. In the present form of device, the extension of the tappet is automatically effected by the combined action of the springs 10 and 12 whenever required for proper adjustment.

The auxiliary member 7 serves to provide a fixed clearance which is not influenced by expansion, contraction and wear of the moving parts except its own parts; whereas, in the conventional type of construction, these factors do affect the valve clearance. Thus in my device the auxiliary member 7 may be considered essentially a fixed clearance member. This clearance is taken up each time the valve opens and re-establishes itself after the valve has closed. This opening and closing action is utilized in that the closing action serves to screw the parts together and the opening action serves to screw them apart. The impacts, the friction, the spring pressures, the fixed clearance and the lead of the threads all have an influence upon the final result and are therefore to be taken into consideration.

The fixed clearance in my linkage will ensure valve closing and the run-out of the cam on the cam shaft having in mind the ramp of each cam lobe, as above referred to, and also will provide impact to introduce minute vibrations to the members 1 and 3 so as to facilitate micrometric adjustments for clearance during the very beginning of the valve-opening.

As elsewhere herein suggested, the clearance member 7 may or may not be used to apply a twist to the buttress threaded parts. This is necessary only to provide an additional factor of safety in case the lead of the buttress threads should be chosen so shallow that even the least friction will not allow more than a micrometric adjustment. Then, in case foreign particles should cause the friction to be considerably increased, a slight kick from the clearance member would ensure dependable free operation. In other words, the mechanism frees itself of dirt which would otherwise cause it to stick.

As stated, the steep threads on the clearance member 7 may or may not be required. If this clearance member imparts an impact, as it does, to the buttress threads, the two main tappet members 1 and 3 will in my device vibrate and consequently slide down the inclined plane to a small extent. This alone may suffice, as it has so proved, in providing clearance since this impact occurs at the instant when the valve starts lifting, before pressure is established. Also, when the valve is seated in my present device and the normal clearance is re-established, again there is no pressure on the tappet and the stiff spring 12 works upward and induces an upward impact much the same as the downward impact. Thus my device is double-acting and each action occurs when there is no high friction to be overcome in the main tappet members 1 and 3. The clearance in the threads of members 1 and 3 together with the impacts of the member 7 ensure free action even if dirt should be present; the impacts will shake the tappet free. In case the tappet members 1 and 3 should stick together because of foreign particles between the threads, then the upward impacts would act at full force; but normally when nothing causes them to stick, the valve and valve spring form a stop for the upward action of the clearance member 7.

Thus, from the above, it will be seen that the clearance member 7 imparts impacts which cause sliding between the threads of members 1 and 3. Also, according to the theory and principle of my present invention, the clearance member 7 may move down and up with only axial motion or with a combined axial and angular motion. The clearance member 7 is double-acting and imparts impacts just before the valve lifts, before the threads lock under load, and again after the valve has closed and the fixed clearance is to be established, which of course happens only when and because there is a minimum of pressure within the system. As also explained, the clearance member 7 performs the double function of facilitating and ensuring adjustment as well as allowing for the run-out of the cam on the cam shaft.

It should be noted also that my present improved form of tappet is capable of rotary movement bodily, in the same manner as the conventional form of tappet, and without such rotary movement interfering with the above-described functioning of my present tappet at all.

To repeat, this device can be manufactured at low cost, it can be adapted for use in different types of motors and in different classes of automotive devices, it can be installed as part of standard equipment as well as upon internal combustion engines already in service, it can be easily handled in the trade, it is highly effective in increasing the operating efficiency of the engine, and from actual test over a prolonged period of time it is believed that it will prove very dependable throughout the life of the motor to which applied.

Other advantages will appear from the foregoing and will readily suggest themselves to those who are familiar with the art to which this invention relates.

What I claim is:

1. An automatically adjustable clearance regulator adapted for assembly and for reciprocation as a completely self-contained unit in the valve linkage of an internal combustion engine, comprising companion members having resiliently-acting inclined surface interengagement with respect to the direction of linkage operation, for relative longitudinal adjustment between said members in either direction for either taking up or providing clearance, and resiliently-acting means extending in the path of the linkage operation and having inclined surface engagement with one of said members for operative connection therewith so as to automatically actuate the same and thereby effect the required longitudinal adjustment between said members in accordance with the length of the valve linkage at any given time.

2. An automatically adjustable clearance regulator adapted for assembly and for reciprocation as a completely self-contained unit in the valve linkage of an internal combustion engine, comprising companion members having automatically self-locking and releasable resiliently-acting inclined surface engagement therebetween with respect to the direction of linkage operation, for relative longitudinal adjustment between said members in either direction for either taking up or providing clearance, and resiliently-acting means extending in the path of the linkage operation and having inclined surface engagement with one of said members for operative connection therewith so as to automatically actuate the same and thereby effect the required longitudinal adjustment between said members in accordance with the length of the valve linkage at any given time.

3. An automatically adjustable clearance regulator adapted for assembly and for reciprocation as a self-contained unit in the valve linkage of an internal combustion engine, comprising companion members having screw-threaded engagement with each other and adapted for relative longitudinal adjustment, a compressible torsional spring arranged and anchored between said members and normally tending to force the same towards distended position, said screw threads being adapted for holding the members in position to which adjusted and being in sections so as to provide increased longitudinal engagement relative to a predetermined amount of positive torque in said spring, and means for automatically adjusting the companion members in accordance with the length of the rest of the valve linkage at any given time by causing the longitudinal pressure within the valve linkage during opening and closing of the valve to move said members relative to each other along said interengaging threaded surfaces, said means having operative connection with one of said companion members so as to actuate the same and thereby effect the required longitudinal adjustment.

4. An automatically adjustable clearance regulator adapted for assembly and for reciprocation as a self-contained unit in the valve linkage of an internal combustion engine, comprising companion members having resiliently acting screw-threaded engagement with each other and adapted for relative longitudinal adjustment in either direction, said screw-threads being adapted for holding the members in position to which adjusted, and resiliently acting means for automatically adjusting the companion members in accordance with the length of the rest of the valve linkage at any given time by causing the longitudinal pressure within the linkage during opening and closing of the valve to move said members relative to each other for actuation of the threaded engagement therebetween, said means being included as part of the reciprocatable unit and having operative engagement with one of said members so as to actuate the same and thereby effect the required longitudinal adjustment.

5. An automatically adjustable clearance regulator adapted for assembly and for reciprocation as a self-contained unit in the valve linkage of an internal combustion engine, comprising companion members having screw-threaded engagement with each other and adapted for relative longitudinal adjustment, said screw-threads being adapted for holding the members in position to which adjusted, a spring arranged within and being under compression for normally forcing said members towards extended position, and means having screw-threaded engagement with one of said members, the incline of said threads being comparatively steep in said last-named engagement with respect to said other threads for causing the longitudinal force in the valve linkage during opening and closing of the valve to effect a combined rotary and axial movement between said means and said member, and spring means normally tending to force said means towards distended position.

6. An automatically adjustable clearance regulator adapted for assembly and for reciprocation as a self-contained unit in the valve linkage of an internal combustion engine, comprising companion members having screw-threaded engagement with each other and adapted for longitudinal relative adjustment, said screw-threads being adapted for holding the members in position to which adjusted, a coil spring arranged within and having one end thereof anchored to one of said members and being under compression for normally tending to force said members towards extended position, and means having screw-threaded engagement with one of said members, the incline of the threads being comparatively steep in said means with respect to said other threads for causing the longitudinal force in the valve linkage during opening and closing of the valve to effect a combined rotary and axial movement between said means and said member, spring means normally tending to force said means towards distended position, said first means being so arranged as to maintain a predetermined clearance between the same and the member to which applied, thereby fixing the clearance to be allowed in the valve linkage, and the threaded portion of said first means having a transverse slot in its inner end and a nut therefor with a slot adapted to register with the slot in said threaded portion, the adjacent end of said spring being anchored in said registered slots so as to lock said nut in position.

7. An automatically adjustable clearance regulator adapted for assembly and for reciprocation as a self-contained unit in the valve linkage of an internal combustion engine, comprising two longitudinally disposed end members and a middle member with which the end members have resiliently acting screw-threaded engagement, the threads between the middle member and one end member being of comparatively steep incline with respect to said other threads so as to cause longitudinal pressure within the valve linkage during opening and closing of the valve to move said members relatively to each other so as to effect the required longitudinal adjustment between said members at any given time, and the threads between the middle member and the other end member being adapted for holding the members in position to which adjusted.

8. An automatically adjustable clearance regulator adapted for assembly and for reciprocation as a self-contained unit in the valve linkage of an internal combustion engine, comprising companion members having screw-threaded engagement with each other for relative longitudinal adjustment, a compressible torsional spring arranged between said members and normally tending to force the same towards extended position, said screw-threads being adapted for holding the members in position to which adjusted, the screw-threads on said companion members being in sections so as to provide increased longitudinal engagement for a predetermined amount of positive torque in said spring, and screw-threaded means for automatically adjusting said companion members in accordance with the length of the rest of the valve linkage at any given time by causing longitudinal pressure within the valve linkage during opening and closing of the valve to move said members relative to each other, and compressible torsional spring means normally tending to force said means towards extended position, said first means having operative connection with one of said companion members so as to actuate the same and thereby effect the longitudinal adjustment between said members as required by the existing conditions at any given time.

OTTO M. BURKHARDT.